(12) United States Patent
Cheng et al.

(10) Patent No.: US 11,556,859 B2
(45) Date of Patent: \*Jan. 17, 2023

(54) METHOD FOR AL MODEL TRANSFERRING WITH LAYER AND MEMORY RANDOMIZATION

(71) Applicants: Baidu USA LLC, Sunnyvale, CA (US); KUNLUNXIN TECHNOLOGY (BEIJING) COMPANY LIMITED, Beijing (CN)

(72) Inventors: Yueqiang Cheng, Sunnyvale, CA (US); Hefei Zhu, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( \* ) Notice: Subject to any disclaimer, the term of this patent is extended or adjusted under 35 U.S.C. 154(b) by 235 days.

This patent is subject to a terminal disclaimer.

(21) Appl. No.: 16/900,584

(22) Filed: Jun. 12, 2020

(65) Prior Publication Data

US 2021/0390463 A1 Dec. 16, 2021

(51) Int. Cl.
*G06N 20/10* (2019.01)
*G06F 9/50* (2006.01)
*G06F 12/08* (2016.01)

(52) U.S. Cl.
CPC .......... *G06N 20/10* (2019.01); *G06F 9/5027* (2013.01); *G06F 12/08* (2013.01)

(58) Field of Classification Search
CPC ...... G06F 21/572; G06F 21/79; G06F 21/126; G06F 9/5027; G06F 12/08; G06N 20/10
See application file for complete search history.

(56) References Cited

U.S. PATENT DOCUMENTS

| | | | |
|---|---|---|---|
| 7,779,216 B2 | 8/2010 | Souders et al. | |
| 8,504,775 B2 | 8/2013 | Plamondon | |
| 9,015,093 B1 | 4/2015 | Commons | |
| 10,284,592 B1 \* | 5/2019 | Powers | G06F 21/14 |
| 10,366,053 B1 | 7/2019 | Zheng et al. | |
| 10,515,216 B2 | 12/2019 | Boutnaru | |
| 10,832,174 B1 \* | 11/2020 | Chen | G06N 3/126 |
| 11,003,994 B2 | 5/2021 | Liang et al. | |
| 11,099,899 B2 | 8/2021 | Shorb | |
| 11,182,691 B1 | 11/2021 | Zhang | |
| 11,250,314 B2 | 2/2022 | Meyerson et al. | |
| 11,287,994 B2 \* | 3/2022 | Choi | G06F 3/0685 |

(Continued)

OTHER PUBLICATIONS

Zappone etal, "Wireless Networks Design in the Era of Deep Learning: Model-Based, AI-Based, or Both", IEEE, pp. 7331-7376 (Year: 2019.

(Continued)

*Primary Examiner* — Aurel Prifti
(74) *Attorney, Agent, or Firm* — Womble Bond Dickinson (US) LLP (57) ABSTRACT

A method to transfer an artificial intelligence (AI) model includes identifying a plurality of layers of the AI model, the plurality of layers organized in a first ordered list. The method further includes randomizing the plurality of layers by reorganizing the first ordered list into a second ordered list, and transferring the plurality of layers of the AI model to a data processing accelerator in an order defined by the second ordered list.

20 Claims, 9 Drawing Sheets

(56) References Cited

U.S. PATENT DOCUMENTS

| | | | |
|---|---|---|---|
| 2019/0138908 A1 | 5/2019 | Bernat et al. | |
| 2019/0213330 A1* | 7/2019 | Shen-Orr | G06F 12/1027 |
| 2020/0151019 A1* | 5/2020 | Yu | G06N 3/08 |
| 2020/0293650 A1* | 9/2020 | Lau | G06F 21/572 |
| 2021/0081353 A1 | 3/2021 | Eno et al. | |
| 2021/0182740 A1* | 6/2021 | Han | G06N 5/04 |
| 2021/0319311 A1* | 10/2021 | Shin | G06K 9/6268 |
| 2021/0374293 A1* | 12/2021 | Bartling | G06F 3/0647 |
| 2021/0390047 A1* | 12/2021 | Cheng | G06N 20/00 |
| 2021/0390462 A1* | 12/2021 | Cheng | G06N 5/04 |

OTHER PUBLICATIONS

Zhou et al., "AAIoT: Accelerating Artificial Intelligence in IIoT Systems", IEEE, pp. 825-828 (Year: 2019.
Uras et al, "WiFi Probes sniffing: an Artificial Intelligence based approach for MAC addresses de-randomization", IEEE, pp. 1-6 (Year: 2020.

* cited by examiner

METHOD FOR AL MODEL TRANSFERRING WITH LAYER AND MEMORY RANDOMIZATION

TECHNICAL FIELD

Embodiments of the present disclosure relate generally to data processing accelerators used for artificial intelligence (AI) model execution. More particularly, embodiments of the disclosure relate to data protection in transfers of AI models from host to accelerator.

BACKGROUND

Artificial intelligence (AI) models (also termed, "machine learning models") have been widely utilized recently as AI technology has been deployed in a variety of fields such as image classification, medical diagnosis, or autonomous driving. Similar to an executable image or binary image of a software application, an AI model, when trained, can perform an inference based on a set of attributes to classify as features. Training of an AI model can require a substantial investment in collecting, collating, and filtering of data to generate an AI model that yields useful predictions.

Generating a prediction from an AI model can be a computationally intensive process. To provide adequate computational power for one or more users, a cluster of data processing accelerators (DPAs) can be provided (e.g., in a cluster) to perform a large number of calculations as required by the AI model. Accordingly, sensitive transactions are increasingly being performed between a host system and data processing (DP) accelerators such as artificial intelligence (AI) accelerators or co-processors. This increases a need to secure the communication channels between DP accelerators and an environment of the host system to protect the communication channels from data sniffing attacks.

For example, data transmission for AI training data, models, and inference outputs may not be protected and may be leaked to untrusted parties over a communication channel. Furthermore, cryptographic key-based solutions to encrypt data over the communication channels may be slow and may not be practical. Furthermore, most cryptographic key-based solutions require a hardware-based cryptographic-engine.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a general-purpose processing unit (GPU), an artificial intelligence (AI) accelerator, math coprocessor, digital signal processor (DSP), or other type of processors. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

A driver of the host device can include a randomization module to randomize an AI model prior to transferring the model to a DP accelerator for execution of the AI model. The randomization module can randomize the AI model using one or more methods for randomization. In one embodiment, the randomization module may randomize the layers of an AI model prior to transfer. In one embodiment, the randomization module may individually randomize the memory address of each of the layers of the AI model. In another embodiment, the randomization module may randomize the AI model using both randomization of layers and randomization of memory addresses.

In one embodiment, a host identifies layers of an AI model organized in a first ordered list. The host randomizes the layers by reorganizing the first ordered list into a second ordered list. The host then transfers the layers of the AI model to a data processing accelerator in an order defined by the second ordered list. In one embodiment, each layer of the AI model is associated with a kernel function of a number of kernel functions of the AI model. In one embodiment, the host updates an association of the kernel functions with the layers of the AI model to a new position of each layer in the second ordered list.

In one embodiment, the first ordered list corresponds to an execution order for the kernel functions associated with the plurality of layers of the AI model. In one embodiment, the host generates an inference using the AI model by executing the layers in the order of execution of the first ordered list using the updated kernel pointers associated with the new position of each layer in the second ordered list. In one embodiment, to randomize the layers the host performs a shuffle function on the first ordered list using a seed number. In one embodiment, to update the kernel pointers the host identifies each of the layers in the second ordered list using the seed number and updates a kernel pointer for each kernel function associated with each layer to point to the new position of each layer in the second ordered list.

In one embodiment, a host identifies a layers of an AI model, each layer of the plurality of layers is associated with a memory address. The host may randomize the memory address associated with each layer of the AI model and transfer the layers with the randomized memory addresses to a data processing accelerator to execute the AI model. In one embodiment, randomizing the memory addresses includes determining an address space of the data processing accelerator and randomly assigning an address of the address space to each of the layers of the AI model. In one embodiment, the host forwards the randomized memory addresses to the data processing accelerator for the data processing accelerator to reconstruct the AI model. In one embodiment, the memory address associated with each layer is a base address for the corresponding layer. In one embodiment, a kernel function is associated with each layer of the plurality of layers. In one embodiment, each kernel function uses the base memory address to retrieve weights from a corresponding layer associated with the kernel function. In one embodiment, the data processing accelerator comprises an AI accelerator.

In one embodiment, a host identifies layers of the AI model organized in a first ordered list and wherein each layer is associated with a memory address. The host can randomize a first subset of the layers to generate a second ordered list of the layers. The host may further randomize the memory address associated with each layer of a second subset of layers. The host then transfers the layers of the AI model to a data processing accelerator with the randomized memory addresses of the first subset of layers based on the second ordered list. In one embodiment, each layer of the plurality of layers is either randomized into the second ordered list or has its corresponding memory address randomized prior to transferring the plurality of layers to the data processing accelerator.

Any of the above functionality can be programmed as executable instructions onto one or more non-transitory computer-readable media. When the executable instructions are executed by a processing system having at least one hardware processor, the processing systems causes the functionality to be implemented. Any of the above functionality can be implemented by a processing system having at least one hardware processor, coupled to a memory programmed with executable instructions that, when executed, cause the processing system to implement the functionality.

Figure 1:
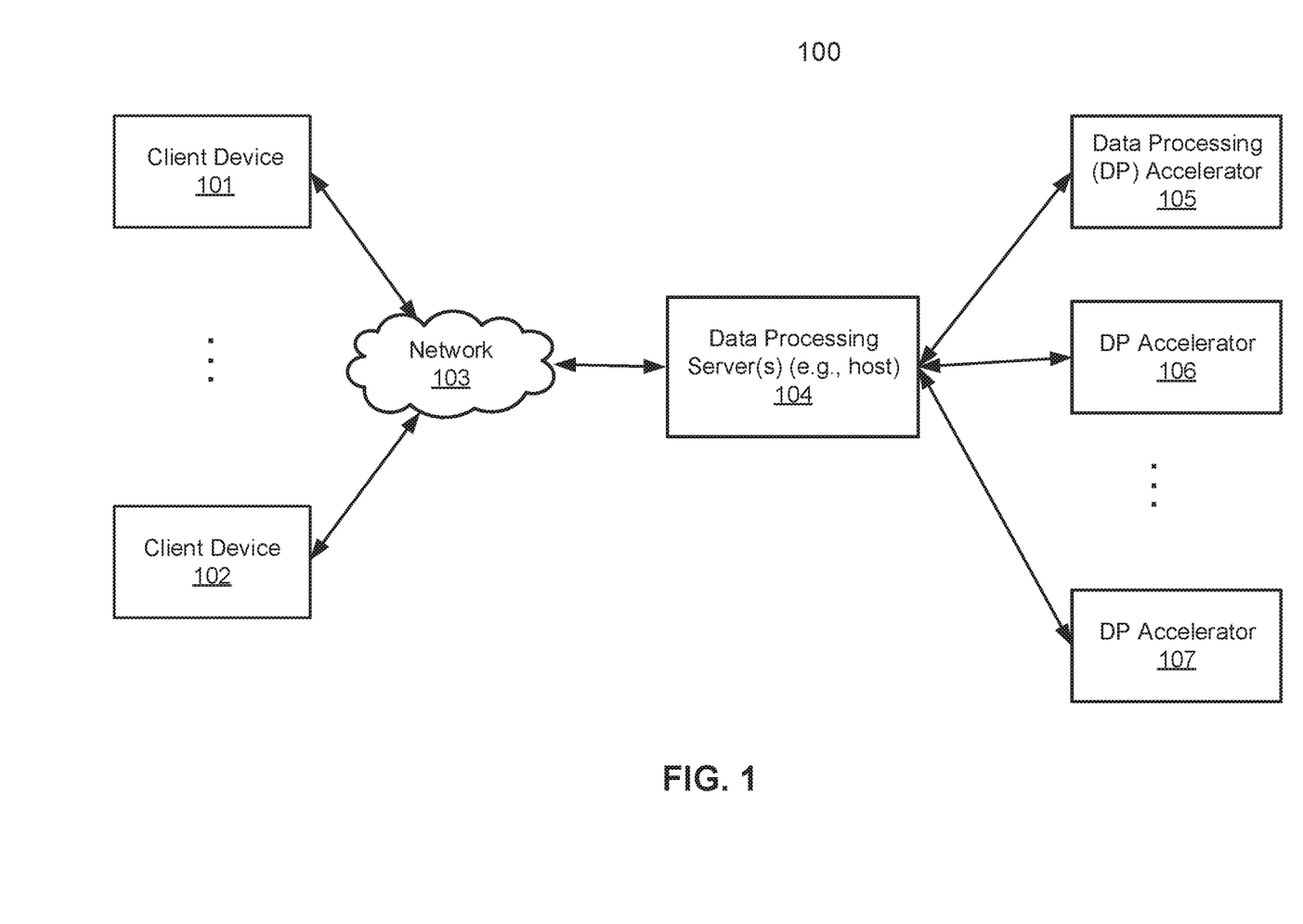
FIG. 1 is a block diagram illustrating a secure processing system, according to one embodiment.

FIG. 1 is a block diagram illustrating a secure processing system, according to some embodiments. Referring to FIG. 1, system configuration 100 includes, but is not limited to, one or more client devices 101-102 communicatively coupled to DP server 104 (e.g. host) via network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. In one aspect, the one or more servers 101-102 host one or more virtual machines which are the clients of the data processing server(s) 104. Network 103 may be any type of network such as a local area network (LAN), a wide area network (WAN) such as the Internet, a high-speed bus, or a combination thereof, wired or wireless.

Server(s) (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client can be a user application of client device 101 (e.g., Web browser, application). The client may send or transmit an instruction (e.g., AI training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to a client device 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions. For example, the order and/or address of layers of an AI model may be randomized at the host 104 prior to transferring the AI model to DP accelerators 105-107.

Figure 2:
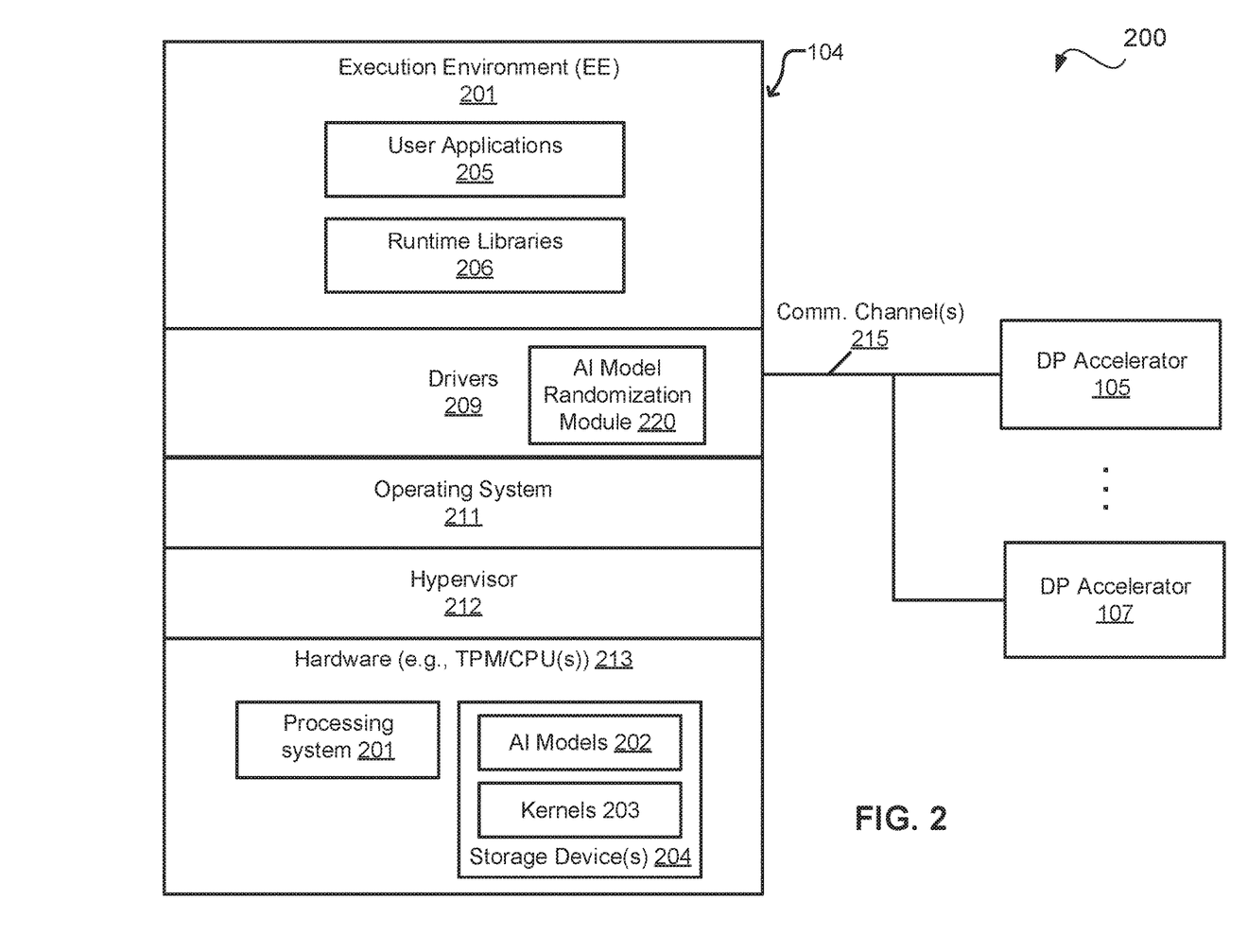
FIG. 2 is a block diagrams illustrating a secure computing environment between one or more hosts and one or more data processing accelerators, according to one embodiment.

FIG. 2 is a block diagram illustrating a secure computing environment 200 between one or more hosts and one or more data processing accelerators (DPAs), according to some embodiments. In one aspect, system 200 provides a protection scheme for obscured communications between host 104 and DP accelerators 105-107 with or without hardware modifications to the DP accelerators 105-107. Host machine or server 104 can be depicted as a system with one or more layers to be protected from intrusion such as user application(s) 205, runtime libraries 206, driver(s) 209, operating system 211, hypervisor 212, and hardware 213 (e.g., security module (trusted platform module (TPM))/central processing unit (CPU)). Below the applications 205 and run-time libraries 206, one or more drivers 209 can be installed to interface to hardware 213 and/or to DP accelerators 105-107.

A driver 209 can include an AI model randomization module 220 for randomizing one or more aspects of an AI model prior to transferring the AI model to the DP accelerators 105. For example, the AI model randomization module 220 can randomize the layers of the AI model prior to transferring to the DP accelerators 105-107. Randomizing the layers can include shuffling an ordered list of the layers. Generally, the layers are transferred according to their order. Randomizing the order of the layers causes the layers to be transferred in the random order. The randomized transfer of the layers may substantially increase the difficulty for an attacker to obtain and rebuild the model.

In another example, the AI model randomization model 220 can individually randomize the memory addresses of each of the layers of the AI model. The memory addresses may be a base address of the layer for the DP accelerator to access when the layer is retrieved during the execution of the AI model. The memory address of a layer references or points to a memory location within a DP accelerator at which the corresponding layer is loaded and executed. Thus, rather than copying the AI model directly to the memory of the DP accelerators 105-107, prior to transferring the AI model, the addresses associated with each of the layers are randomized. In another example, the AI model randomization module 220, may randomize the order of at least some layers of the AI model and randomize memory addresses of the other layers.

Hardware 213 can include a processing system 201 having one or more processor(s) 201. Hardware 213 can further include and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions.

System 200 includes host system 104 and DP accelerators 105-107 according to some embodiments. Although only three are depicted, system 200 can include any number of DP accelerators. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip can also secure driver(s) 209 and operating system (OS) 211 in a working kernel space to communicate with the DP accelerators 105-107. Here, driver 209 is provided by a DP accelerator vendor and can serve as a driver 209 for the user applications 205 to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively used by the OS 211 and driver 209, communication channels 215 can be secured through the TPM chip. In an aspect, communication channels 215 include a peripheral component interconnect (PCI) or peripheral component interconnect express (PCIE) channel. In an aspect, communication channels 215 are obscured communication channels.

In one embodiment, the user application 205 can only call a kernel from a set of kernels as predetermined by runtime libraries 206. In another aspect, user application 205 and runtime libraries 206 are hardened with a side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, user applications 205 and/or runtime libraries 206 are hosted in an operating system environment (e.g., execution environment 201) of host 104. In one embodiment, the set of kernels 203 include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm.

Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations.

Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

Runtime 206 can provide obfuscation kernel algorithms to obfuscate data communication between a host 104 and DP accelerators 105-107. In one embodiment, the obfuscation can be paired with a cryptography scheme. In another embodiment, the obfuscation is the sole protection scheme and cryptography-based hardware is rendered unnecessary for the DP accelerators.

Figure 3:
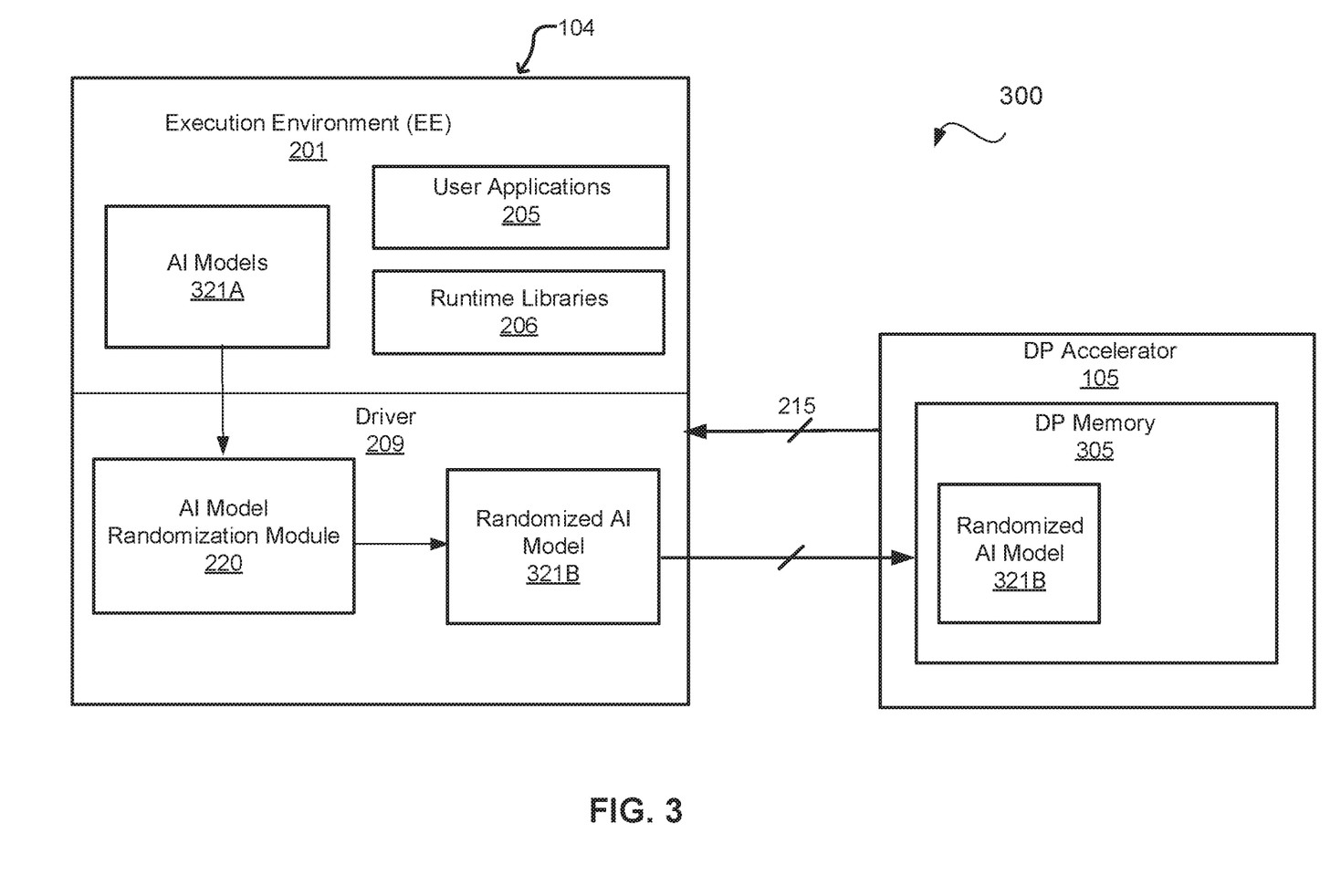
FIG. 3 is a block diagram illustrating transfer of an AI model to a cluster of data processing accelerators, according to an embodiment.

FIG. 3 illustrates an example of a host in communication with a DP accelerator according to one embodiment. The system 300 can include EE 201 of host 104 in communication with DP accelerator 105. EE 201 of host 104 can include user application 205, runtime libraries 206, and persistent or non-persistent storage (not depicted). One or more AI model randomization modules 220 along with one or more AI models 321A can be stored in the persistent or non-persistent storage. User applications 203 of host 104 can establish obscured communication channel(s) 215 with DP accelerator 105. The obscured communication channel(s) 215 can be established for the host 104 to transmit trained AI models to DP accelerator 105.

In one embodiment, when a user application 205 initiates a training or an inference for an AI model (e.g., AI models 321) to be executed on the DP accelerator 105, the AI model randomization module 220 of the driver 209 may randomize the AI model 321A prior to transferring the AI model 321A to the DP accelerator 105. For example, the AI model 321A may be randomized to produce a randomized AI model 321B to be transferred to the DP accelerator 105 where the randomized AI model 321B will be stored in DP memory 305. Although the AI model 321 may be randomized, the kernels of the runtime libraries 206 may be updated to track the changes such that the AI model may still be executed as intended.

Figure 4:
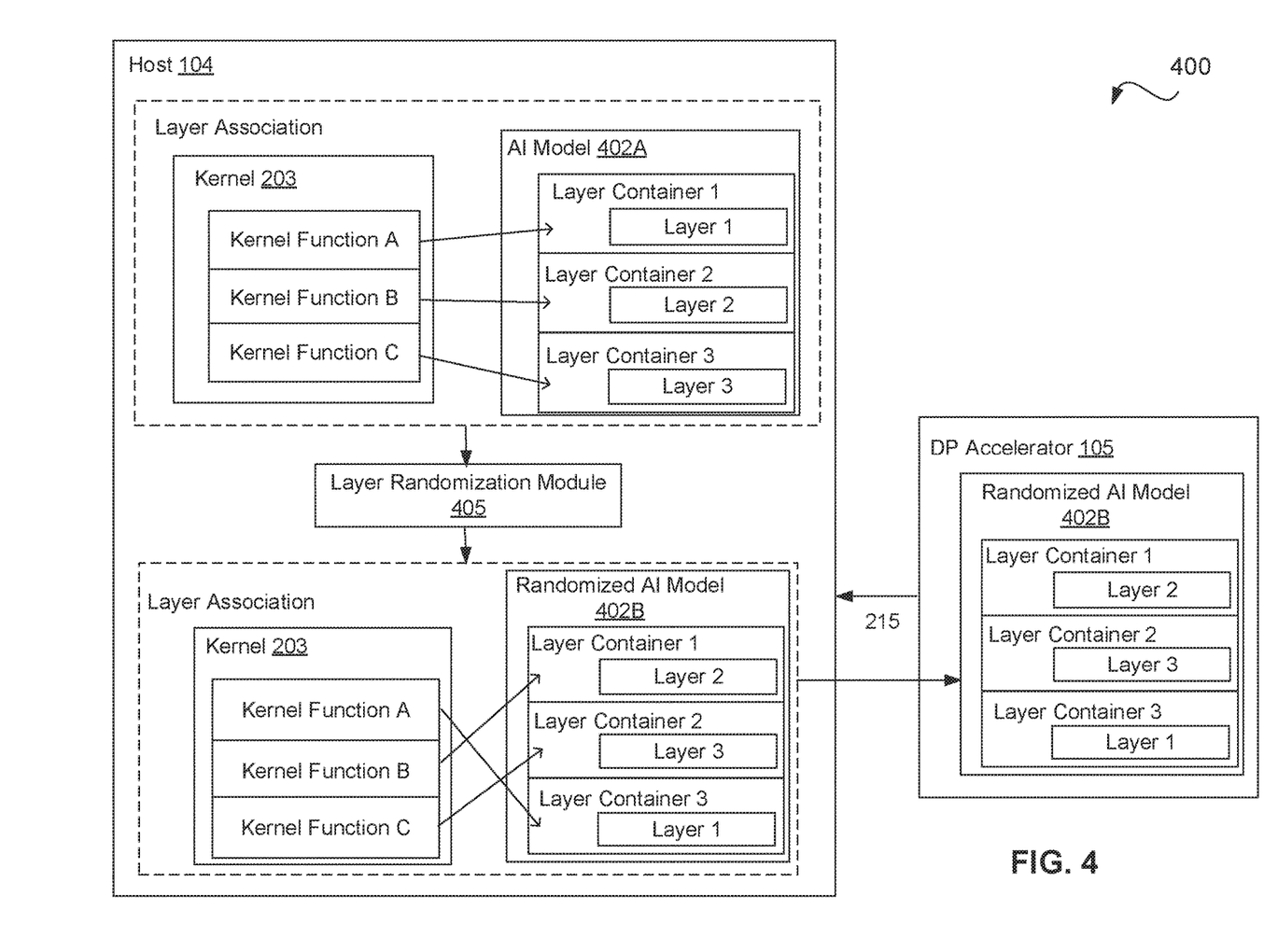
FIG. 4 is a block diagram illustrating a system for protecting transfer of an AI model from a host to a data processing accelerator using randomization of layers, according to an embodiment.

FIG. 4 illustrates a system 400 for layer randomization of an AI model prior to transfer of the model to a DP accelerator. As shown in FIG. 4, a host 104 may include an AI model 402A that is to be transferred to and run on DP accelerator 105. To protect the AI model from attacks during transfer of the AI model 402, a layer randomization module 405 may randomize the layers of the AI model 402 prior to transferring the AI model 402 to the DP accelerator 105. AI model 402 may be the same as, similar to, or included in the AI model 321, as described with respect to FIG. 3. Layer randomization module 405 may be the same as, similar to, or included in randomization module 220, as described with respect to FIG. 3.

In one embodiment, each layer of the AI model 402A may be associated with a kernel function of a kernel 203. As depicted, kernel 203 may include kernel function A, kernel function B, and kernel function C. AI model 402 may include layer container 1, layer container 2, and layer container 3. Prior to randomization, layer container 1 includes layer 1, layer container 2 includes layer 2, and layer container 3 includes layer 3. Each of the layer containers 1-3 are associated with one of the kernel functions. It should be noted that the kernel 203 may include any number of kernel functions and AI model 402 may include any number of layers (e.g., input layer, output layer, and one or more intermediate layers in between). In some embodiments, AI model can include hundreds or thousands of layers. Prior to randomization by the layer randomization module 405, the layers of the AI model 402 may be organized in the order that the layers are to be used by the kernel 203 during execution of the AI model 402.

As depicted, kernel function A may be associated with layer 1, kernel function B may be associated with layer 2, and kernel function C may be associated with layer 3. The layer randomization module 405 may randomize the layers of the AI model 402. The kernel functions may remain associated with the same layers of the AI model but point to a different layer container in the list of layers. A kernel pointer of each of the kernel functions can be updated to identify the same layer in the randomized layer order. Thus, after randomization kernel function A may point to layer container 3 of the list which includes layer 1, kernel function B may point to layer container 1 of the list which includes layer 2, and kernel function C may point to layer container 2 of the list which includes layer 3. The randomized AI model 402B may then be transferred to the DP accelerator 105.

In one embodiment, the layer randomization module 405 may perform a shuffle function on the layers of the AI model 402A to randomize the layers. A seed number can be generated using a hardware based random number generator. The layer randomization module 405 can use the seed number to perform the shuffle function.

Figure 5:
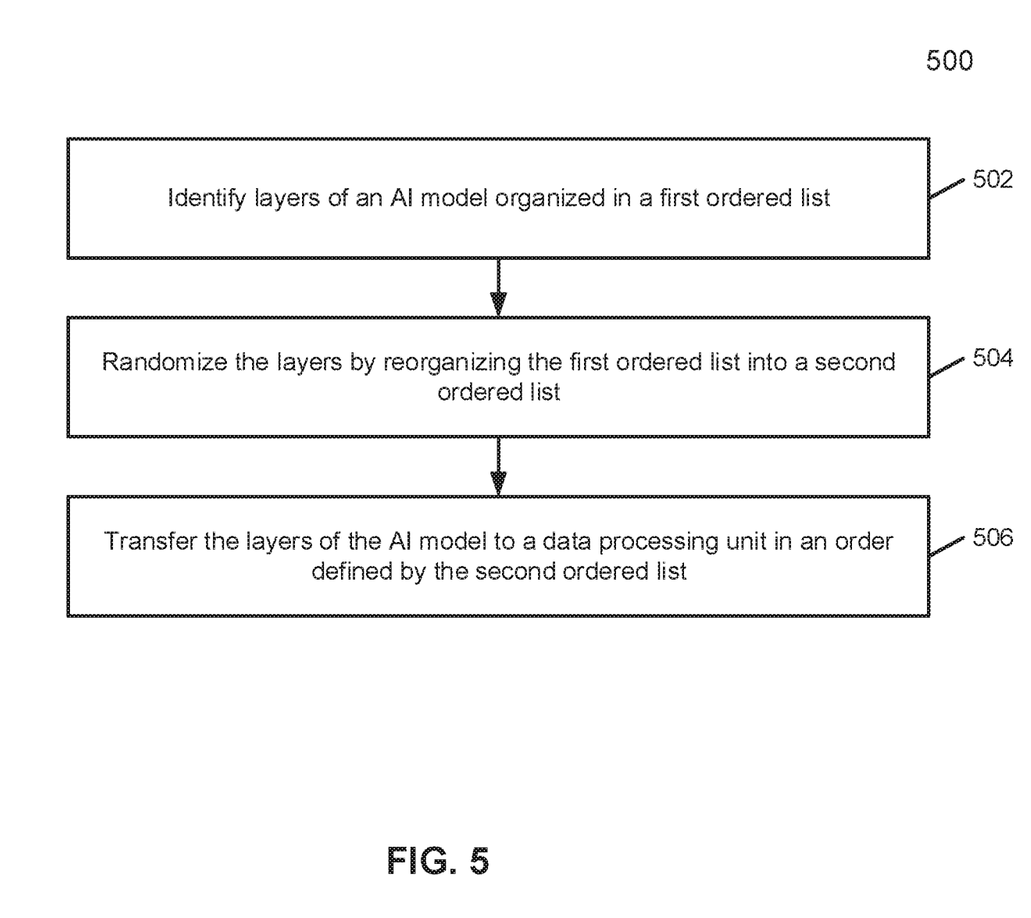
FIG. 5 is a flow diagram illustrating a method of protecting transfer of an AI model from a host to a data processing accelerator using randomization of layers, according to an embodiment.

FIG. 5 is a flow diagram illustrating an example method for randomizing layers of an AI model. Process 500 may be performed by processing logic which may include software, hardware, or a combination thereof. For example, process 500 may be performed by a layer randomization module 405 of a driver of a host system, as depicted in FIG. 4. Referring to FIG. 5, at block 502, the processing logic identifies layers of an AI model organized in a first ordered list. The first ordered list may indicate an original and intended order for the layers of the AI model. In one embodiment, a kernel function on the host may be associated with each layer container. For example, a set of kernel functions may each call one or more layers of the AI model in the associated layer containers as needed for proper execution of the AI model. The kernel functions may execute in an order that uses the layers as defined by the first ordered list. Each kernel may identify the associated layer using a pointer identifying the layer.

At block 504, the processing logic randomizes the layers by reorganizing the first ordered list into a second ordered list. In one embodiment, a shuffle function can be performed on the first ordered list to randomize the list. The shuffle function can receive a seed number for randomization. In one embodiment, the seed number can be a hardware or software generated random number. The seed number and shuffle function may be used by the host to identify the updated list and the positions of each of the layers in the second ordered list. The processing logic can then update the pointers for each kernel to point to the correct position in the second ordered list so that the proper order of execution of the layers can be performed by the kernel functions.

At block 506, the processing logic transfers the layers of the AI model to a data processing accelerator in an order defined by the second ordered list. Thus, the AI model can be transferred from a host to a DP accelerator in the randomized order.

Figure 6:
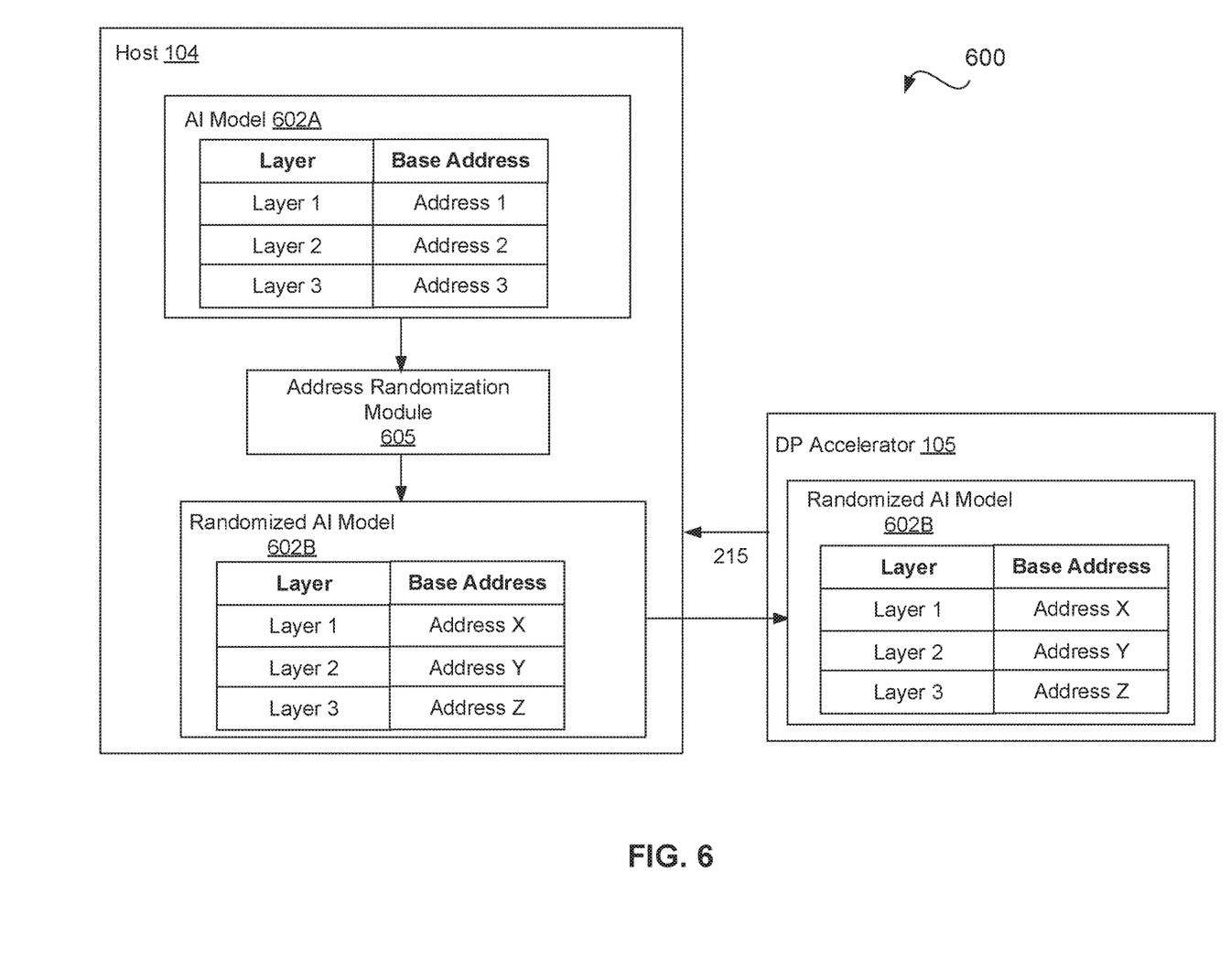
FIG. 6 is a block diagram illustrating a system for protecting transfer of an AI model from a host to a data processing accelerator using randomization of memory addresses, according to an embodiment.

FIG. 6 illustrates a system 600 for address randomization of an AI model prior to transfer of the AI model to a DP accelerator. As shown in FIG. 6, a host 104 may include an AI model 602A that is to be transferred to and run on DP accelerator 105. To protect the AI model from attacks during transfer of the AI model 602 (e.g., on a PCIe bus), an address randomization module 605 may individually randomize the memory addresses for the AI model 602 prior to transferring the AI model 602. Note that the address being randomized is the memory address locations of each of the layers to be stored on the DP accelerator. AI model 602 may be the same as, similar to, or included in the AI model 321, as described with respect to FIG. 3. Address randomization module 605 may be the same as, similar to, or included in randomization module 220, as described with respect to FIG. 3.

In one embodiment, the AI model 602A may include multiple layers, each associated with a memory address to be stored on the DP accelerator. The memory address may be a base address of the layer. The address randomization module 605 may randomize the addresses associated with the layers of the AI model. The kernel and/or kernel functions on the host can be updated with the new memory addresses for each layer. Therefore, the kernel can still reference each layer using the updated address and queue the layers according to the AI model 602A. The resulting randomized AI model 602A may then be transferred to the DP accelerator 105.

For example, as depicted in FIG. 6, the AI model 602A may include layer 1 at memory address 1, layer 2 at memory address 2, and layer 3 at memory address 3. The address randomization module 605 may then randomize the address for each layer. After the address randomization, layer 1 may then be at memory address X, layer 2 may be at address Y, and layer 3 may be at address Z. In additional to the randomized addresses, the address randomization module 605 may update, at one or more kernel functions, the addresses for the layers so that the layers can be queued during execution of the AI model 602.

Figure 7:
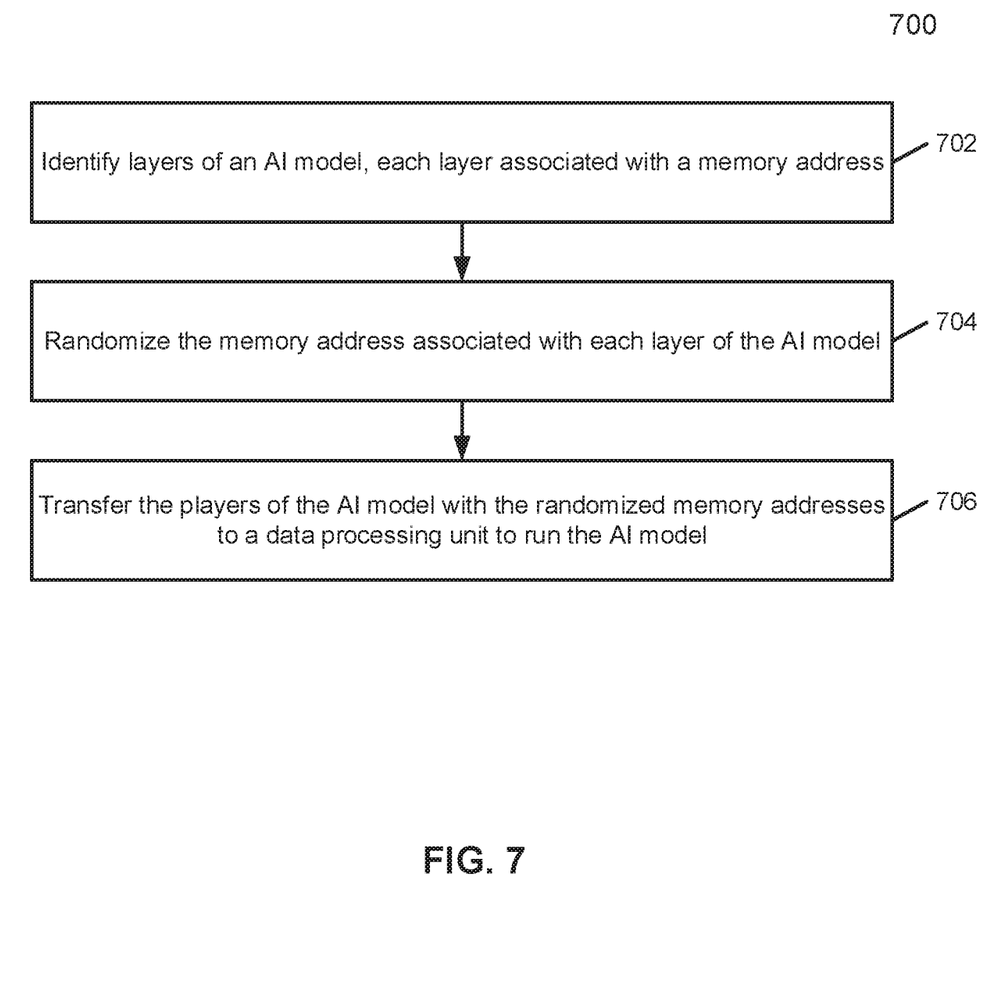
FIG. 7 is a flow diagram illustrating a method of protecting transfer of an AI model from a host to a data processing accelerator using randomization of memory addresses, according to an embodiment.

FIG. 7 is a flow diagram illustrating an example method for randomizing memory addresses of an AI model. Process 700 may be performed by processing logic which may include software, hardware, or a combination thereof. For example, process 700 may be performed by a layer memory address randomization module 605 of a driver of a host system, as depicted in FIG. 6. Referring to FIG. 7, at block 702 the processing logic identifies multiple layers of an AI model, each layer being associated with a memory address. For example, the memory address may be a base address of a layer stored at DP accelerator (or addresses within a binary file to be sent to the DP accelerator) used by a kernel and/or kernel function to access the layer when needed for execution of the AI model by DP accelerator. Kernel functions of the host may queue the layers of the AI model using the base addresses for the AI model layers. In another embodiment, the kernel functions may be sent to the DP accelerator and the kernel functions at the DP accelerator may access the layers of the AI model according to the randomized base addresses based on a mapping table. The mapping table may be metadata sent form the host to the DP accelerator.

At block 704, the processing logic randomized the memory address associated with each layer of the AI model. Randomizing the base addresses can include identifying a memory space for the DP accelerator and selecting, at random, a memory address within the memory space to associate with each layer of the AI model. The kernel functions of the host may be updated with the randomized memory addresses. At block 706, the processing logic transfers the layers of the AI model with the randomized memory addresses to a data processing accelerator to run the AI model.

Figure 8:
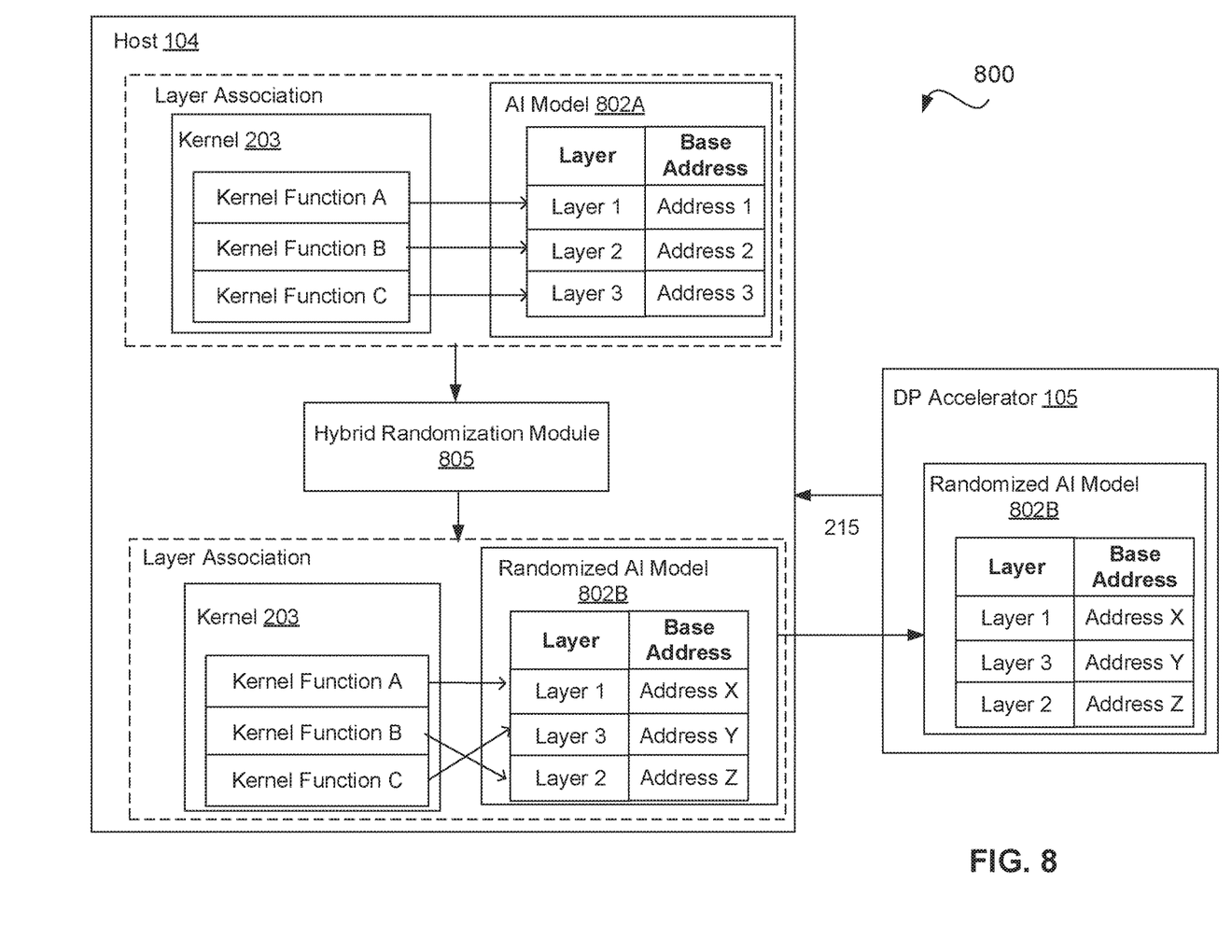
FIG. 8 is a block diagram illustrating a system for protecting transfer of an AI model from a host to a data processing accelerator using hybrid randomization of layers and memory addresses, according to an embodiment.

FIG. 8 illustrates a system 800 for layer and address randomization of an AI model prior to transfer of the model to a DP accelerator. As shown in FIG. 8, a host 104 may include an AI model 802A that is to be transferred to and run on DP accelerator 105. To protect the AI model from attacks during transfer of the AI model 802, a hybrid randomization module 805 may randomize an order of a portion of the layers of the AI model 802 (as described in FIGS. 4 and 5) and randomize addresses of another portion of the AI model (as described with respect to FIGS. 6 and 7) prior to transferring the AI model 802 to the DP accelerator 105. In one embodiment, each layer can be randomized by address, randomized by layer order, or both by address and layer. AI model 802 may be the same as, similar to, or included in the AI model 321, as described with respect to FIG. 3. Hybrid randomization module 805 may be the same as, similar to, or included in randomization module 220, as described with respect to FIG. 3.

In one embodiment, the AI model 802A may include multiple layers, each associated with a memory address. The memory address may be a base address of the layer at the DP accelerator or a base address of the layer within a binary file. Additionally, each layer of the AI model 402A may be associated with a kernel function of a kernel 203. The hybrid randomization module 805 can randomize the addresses associated with a subset of the layers of the AI model 802. A subset may include a portion of the layers or may include all of the layers. The hybrid randomization module 805 can also randomize a memory address of a second subset of the layers of the AI model. The second subset may include a portion of the layers or may include all of the layers. The subset that is randomized by address may overlap with the second subset that is randomized by layer. For example, for each layer the hybrid randomization module 805 can select whether the layer order for the layer is randomized, if the memory address of the layer is to be randomized or both the layer order and the memory address is randomized. Once each layer is determined to be randomized via layer order, by memory address, or both, the randomizations can be performed. The kernel and/or kernel functions on the host can be updated with the new memory addresses for each layer and new pointers corresponding to the new order of the layers. Therefore, the kernel can still reference each layer using the updated address and queue the layers according to the AI model 802A. The resulting randomized AI model 802A may then be transferred to the DP accelerator 105.

For example, as depicted in FIG. 8, prior to randomization, kernel function A can be associated with layer 1 of the AI model 802A and layer 1 can be located at address 1. Kernel function B can be associated with layer 2 of the AI model 802A and layer 2 can be located at address 2. Kernel function C can be associated with layer 3 of the AI model 802A and layer 3 can be located at address 3. The hybrid randomization module 805 can then randomize the layer order and the memory addresses of the AI model 802A. The resulting randomized AI model 802B can include an updated layer order as well as one or more updated layer addresses. As depicted in FIG. 8, the layer order is now layer 1, then layer 3, then layer 2, and the address for layer 1 has been randomized to be address X, the address for layer 3 has been randomized to address Y, and the layer 2 address had been randomized to address Z. Thus, in this example, layers 2 and 3 were selected for both layer order randomization and address randomization while layer 1 was selected for address randomization. The kernel 203 may be updated with the proper associations of kernel function to layer, as depicted. The randomized AI model 802B can then be transferred to the DP accelerator 105 in any random fashion indicating which base address is associated with a respective layer. In another embodiment, the randomized AI model 802B is sent to the DP accelerator 105 according to the randomized base address associated with each of the layers. The combination of randomizations can increase a difficulty of rebuilding the model if obtained through a communications channel attack during transfer of the AI model (e.g., via a PCIe bus).

Figure 9:
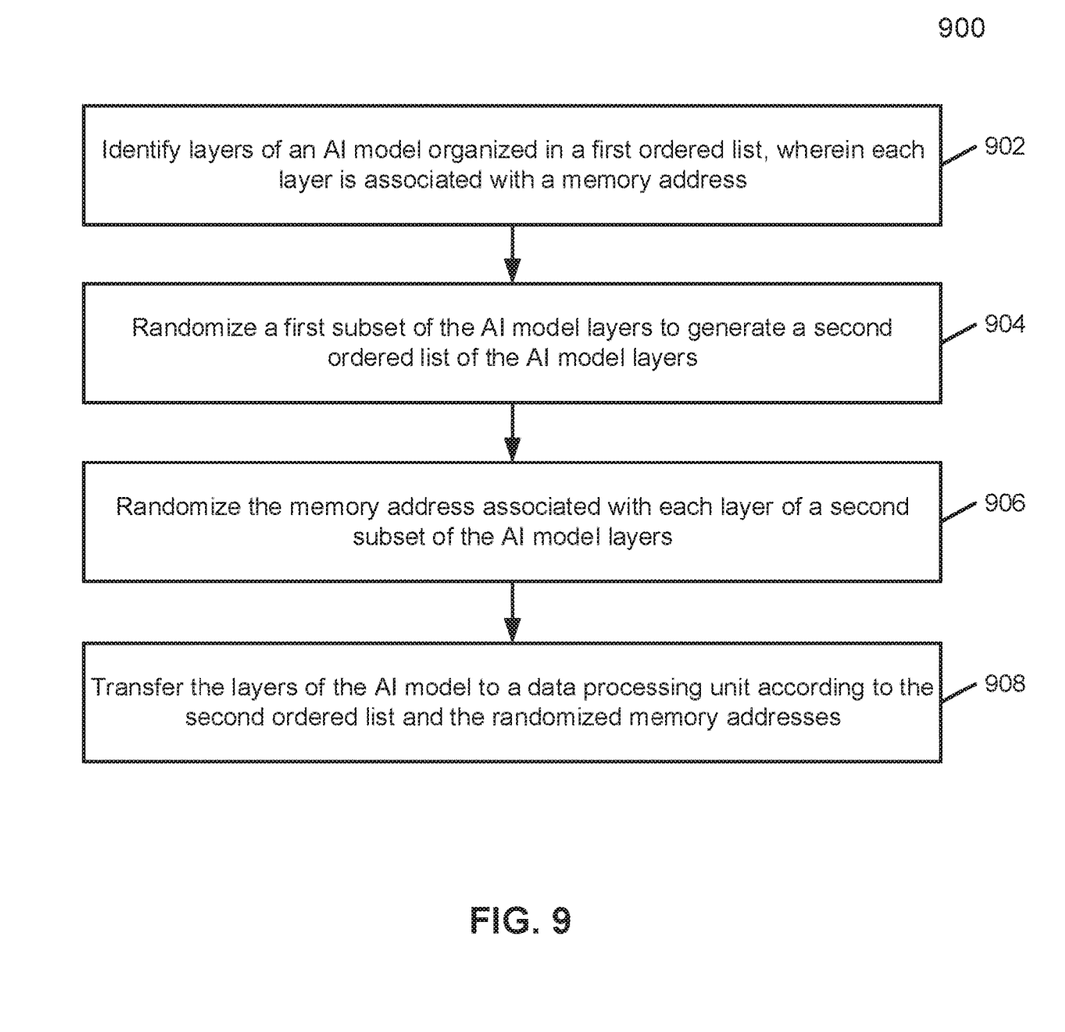
FIG. 9 is a flow diagram illustrating a method of protecting transfer of an AI model from a host to a data processing accelerator using hybrid randomization of layers and memory addresses, according to an embodiment.

FIG. 9 is a flow diagram illustrating an example method for hybrid randomization of layers and memory addresses of an AI model. Process 900 may be performed by processing logic which may include software, hardware, or a combination thereof. For example, process 900 may be performed by a hybrid randomization module 805 of a driver of a host system, as depicted in FIG. 8. Referring to FIG. 9, at block 902, the processing logic identifies layers of an AI model organized in a first ordered list, wherein each layer is associated with a memory address. In one embodiment, the memory address of each layer are the base addresses of the AI model used by kernel functions of the host to access the layers.

At block 904, the processing logic randomizes an order of a first subset of the AI model layers to generate a second ordered list of the AI model layers. In one embodiment, a shuffle function can be performed on the first ordered list to randomize the list. The shuffle function can be deterministic or entropy based. For example, the shuffle function can also receive a seed number for randomization. If the same list and seed number are provided then the resulting randomized list may be the same (i.e., deterministic randomization). The seed number and shuffle function may be used by the host kernel to identify the updated list and the positions of each of the layers in the second ordered list. The processing logic can then update the pointers for each kernel function to point to the correct position in the second ordered list so that the proper order of execution of the layers can be performed by the kernel functions.

At block 906, the processing logic randomizes the memory address associated with each layer of a second subset of the AI model layers. Randomizing the base addresses can include identifying a memory space for the DP accelerator and selecting, at random, a memory address within the memory space to associate with each layer of the AI model. The kernel functions of the host may also be updated with the randomized memory addresses.

At block 908, the processing logic transfers the layers of the AI model to a data processing accelerator based on the second ordered list and with the memory addresses as randomized. In one embodiment, the second ordered list defines the order in which the layers of the AI model are transferred to the DP accelerator. In one embodiment, the addresses of the randomized AI model are then used for the randomized AI model 802B in memory of the DP accelerator.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to transfer an artificial intelligence (AI) model, comprising:
   identifying a plurality of layers of the AI model, the plurality of layers organized in a first ordered list and wherein each layer is associated with a memory address;
   randomizing, by a processing device, a first subset of the plurality of layers to generate a second ordered list of the plurality of layers, wherein the second ordered list places the plurality of layers in a different order compared against the first ordered list;
   randomizing, by the processing device, the memory address associated with each layer of a second subset of layers; and
   transferring, by the processing device, the plurality of layers of the AI model to a data processing accelerator according to the second ordered list and the randomized memory addresses.

2. The method of claim 1, wherein each layer of the plurality of layers is either randomized into the second ordered list and/or has its corresponding memory address randomized prior to transferring the plurality of layers to the data processing accelerator.

3. The method of claim 1, wherein the memory address associated with each layer is a base memory address for the corresponding layer.

4. The method of claim 3, wherein each layer is further associated with a kernel function.

5. The method of claim 4, wherein the kernel function associated with each layer uses the base memory address to retrieve weights from the corresponding layer.

6. The method of claim 1, wherein randomizing the memory addresses comprises:
   determining an address space of the data processing accelerator; and
   randomly assigning an address of the address space to each of the layers of the AI model.

7. The method of claim 1, wherein the data processing accelerator comprises one or more artificial intelligence (AI) accelerators.

8. A system to transfer an artificial intelligence (AI) model, the system comprising:
   a memory; and
   a processing device operatively coupled to the memory, the processing device to:
   identify a plurality of layers of the AI model, the plurality of layers organized in a first ordered list and wherein each layer is associated with a memory address;
   randomize a first subset of the plurality of layers to generate a second ordered list of the plurality of layers, wherein the second ordered list places the plurality of layers in a different order compared against the first ordered list;
   randomize the memory address associated with each layer of a second subset of layers; and
   transfer the plurality of layers of the AI model to a data processing accelerator according to the second ordered list and the randomized memory addresses.

9. The system of claim 8, wherein each layer of the plurality of layers is either randomized into the second ordered list and/or has its corresponding memory address randomized prior to transferring the plurality of layers to the data processing accelerator.

10. The system of claim 8, wherein the memory address associated with each layer is a base memory address for the corresponding layer.

11. The system of claim 10, wherein each layer is further associated with a kernel function.

12. The system of claim 11, wherein the kernel function associated with each layer uses the base memory address to retrieve one or more weights from the corresponding layer.

13. The system of claim 8, wherein to randomize the memory addresses the processing device is to:
   determine an address space of the data processing accelerator; and
   randomly assign an address of the address space to each of the layers of the AI model.

14. The system of claim 8, wherein the data processing accelerator comprises one or more artificial intelligence (AI) accelerators.

15. A non-transitory machine readable storage medium storing instructions that, when executed by a processing device, perform operations comprising:
   identifying a plurality of layers of an Artificial Intelligence (AI) model, the plurality of layers organized in a first ordered list and wherein each layer is associated with a memory address;
   randomizing, by the processing device, a first subset of the plurality of layers to generate a second ordered list of the plurality of layers, wherein the second ordered list places the plurality of layers in a different order compared against the first ordered list;
   randomizing, by the processing device, the memory address associated with each layer of a second subset of layers; and
   transferring, by the processing device, the plurality of layers of the AI model to a data processing accelerator according to the second ordered list and the randomized memory addresses.

16. The non-transitory machine readable storage medium of claim 15, wherein each layer of the plurality of layers is either randomized into the second ordered list and/or has its corresponding memory address randomized prior to transferring the plurality of layers to the data processing accelerator.

17. The non-transitory machine readable storage medium of claim 16, wherein the memory address associated with each layer is a base memory address for the corresponding layer.

18. The non-transitory machine readable storage medium of claim 17, wherein each layer is further associated with a kernel function.

19. The non-transitory machine readable storage medium of claim 18, wherein the kernel function associated with each layer uses the base memory address to retrieve weights from the corresponding layer.

20. The non-transitory machine readable storage medium of claim 16, wherein randomizing the memory addresses comprises:
  determining an address space of the data processing accelerator; and
  randomly assigning an address of the address space to each of the layers of the AI model.

* * * * *